United States Patent [19]
Collins, Jr.

[11] Patent Number: 5,927,443
[45] Date of Patent: Jul. 27, 1999

[54] WHEEL CHOCK ASSEMBLY

[76] Inventor: Charles E. Collins, Jr., 5930 Mimika Ave., St. Louis, Mo. 63147

[21] Appl. No.: 09/156,081

[22] Filed: Sep. 17, 1998

[51] Int. Cl.⁶ .................................................. B60T 3/00
[52] U.S. Cl. ........................................ 188/32; 188/4 R
[58] Field of Search .................. 410/30, 49; 414/396, 414/401; D12/217, 4 R; 188/32; 70/18, 226

[56] References Cited

U.S. PATENT DOCUMENTS

| | | | |
|---|---|---|---|
| 2,773,564 | 12/1956 | Garard | 188/32 |
| 3,189,127 | 6/1965 | Karnow et al. | 188/32 |
| 4,399,893 | 8/1983 | Switzer | 188/32 |
| 5,490,582 | 2/1996 | Trowbridge | 188/32 |
| 5,613,385 | 3/1997 | Yamabe | 188/32 |

*Primary Examiner*—Chris Schwartz

[57] ABSTRACT

A wheel chock assembly for wedging beneath a pair of wheels of a vehicle to prevent the vehicle from moving. The wheel chock assembly includes an elongate rod having a pair of opposite ends and a pair of wheel chocks each having a bore therethrough. The rod is extended through the bores of the wheel chocks. One of the wheel chocks is positioned towards one of the ends of the rod and the other of the wheel chocks is positioned towards another end of the rod.

16 Claims, 2 Drawing Sheets

WHEEL CHOCK ASSEMBLY

BACKGROUND OF THE INVENTION

1. Field of the Invention

The present invention relates to wheel chocks and more particularly pertains to a new wheel chock assembly for wedging beneath a pair of wheels of a vehicle to prevent the vehicle from moving.

2. Description of the Prior Art

The use of wheel chocks is known in the prior art. More specifically, wheel chocks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,392,880; U.S. Pat. No. 4,867,278; U.S. Pat. No. 4,659,266; U.S. Pat. No. 4,354,580; U.S. Pat. No. 4,895,225; and U.S. Pat. No. Des. 307,575.

While these devices fulfill their respective, particular objectives and requirements, the aforementioned patents do not disclose a new wheel chock assembly. The inventive device includes an elongate rod having a pair of opposite ends and a pair of wheel chocks each having a bore therethrough. The rod is extended through the bores of the wheel chocks. One of the wheel chocks is positioned towards one of the ends of the rod and the other of the wheel chocks is positioned towards another end of the rod.

In these respects, the wheel chock assembly according to the present invention substantially departs from the conventional concepts and designs of the prior art, and in so doing provides an apparatus primarily developed for the purpose of wedging beneath a pair of wheels of a vehicle to prevent the vehicle from moving.

SUMMARY OF THE INVENTION

In view of the foregoing disadvantages inherent in the known types of wheel chocks now present in the prior art, the present invention provides a new wheel chock assembly construction wherein the same can be utilized for wedging beneath a pair of wheels of a vehicle to prevent the vehicle from moving.

The general purpose of the present invention, which will be described subsequently in greater detail, is to provide a new wheel chock assembly apparatus and method which has many of the advantages of the wheel chocks mentioned heretofore and many novel features that result in a new wheel chock assembly which is not anticipated, rendered obvious, suggested, or even implied by any of the prior art wheel chocks, either alone or in any combination thereof.

To attain this, the present invention generally comprises an elongate rod having a pair of opposite ends and a pair of wheel chocks each having a bore therethrough. The rod is extended through the bores of the wheel chocks. One of the wheel chocks is positioned towards one of the ends of the rod and the other of the wheel chocks is positioned towards another end of the rod.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new wheel chock assembly apparatus and method which has many of the advantages of the wheel chocks mentioned heretofore and many novel features that result in a new wheel chock assembly which is not anticipated, rendered obvious, suggested, or even implied by any of the prior art wheel chocks, either alone or in any combination thereof.

It is another object of the present invention to provide a new wheel chock assembly which may be easily and efficiently manufactured and marketed.

It is a further object of the present invention to provide a new wheel chock assembly which is of a durable and reliable construction.

An even further object of the present invention is to provide a new wheel chock assembly which is susceptible of a low cost of manufacture with regard to both materials and labor, and which accordingly is then susceptible of low prices of sale to the consuming public, thereby making such wheel chock assembly economically available to the buying public.

Still yet another object of the present invention is to provide a new wheel chock assembly which provides in the apparatuses and methods of the prior art some of the advantages thereof, while simultaneously overcoming some of the disadvantages normally associated therewith.

Still another object of the present invention is to provide a new wheel chock assembly for wedging beneath a pair of wheels of a vehicle to prevent the vehicle from moving.

Yet another object of the present invention is to provide a new wheel chock assembly which includes an elongate rod having a pair of opposite ends and a pair of wheel chocks each having a bore therethrough. The rod is extended through the bores of the wheel chocks. One of the wheel chocks is positioned towards one of the ends of the rod and the other of the wheel chocks is positioned towards another end of the rod.

Still yet another object of the present invention is to provide a new wheel chock assembly that allows a user to quickly place a pair of wheel chocks beneath a pair of wheels of a vehicle essentially at the same time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
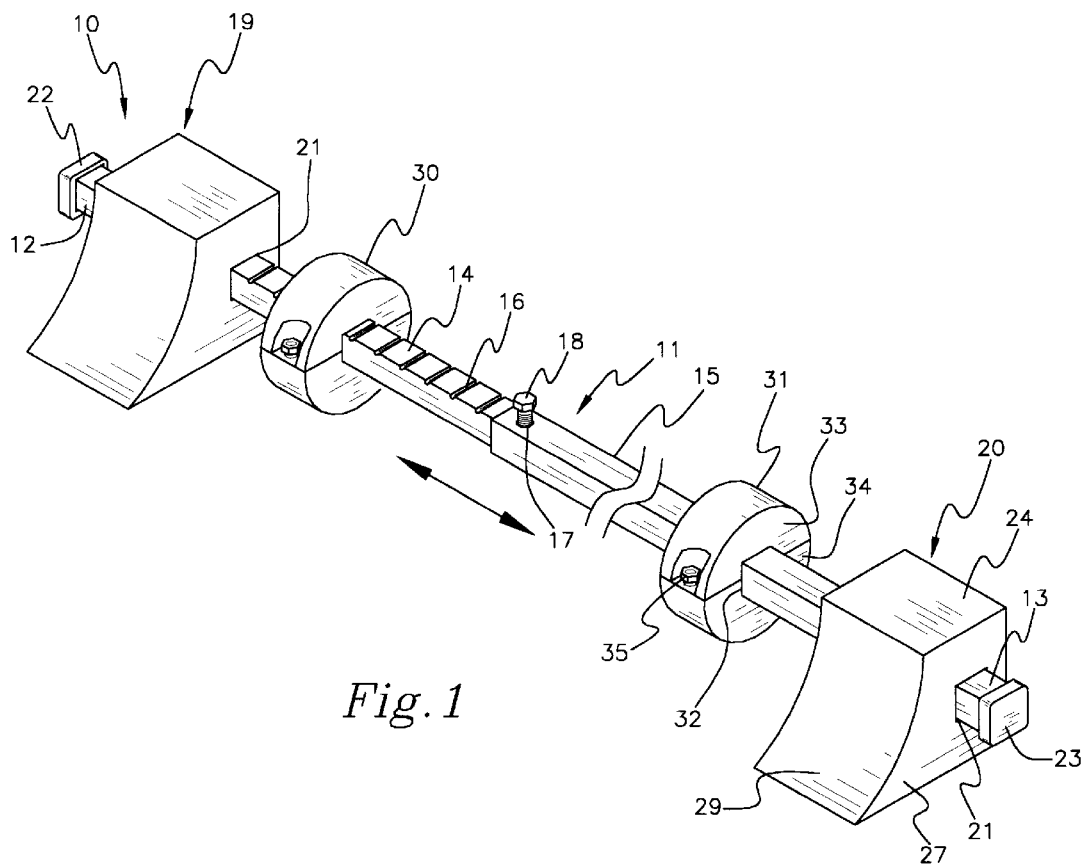
FIG. 1 is a schematic perspective view of a new wheel chock assembly according to the present invention.
Figure 2:
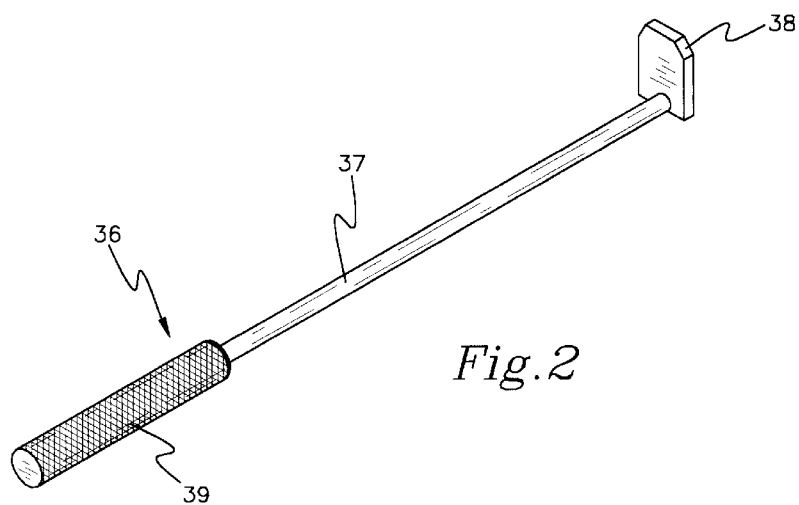
FIG. 2 is a schematic perspective view of a pulling tool of the present invention.
Figure 3:
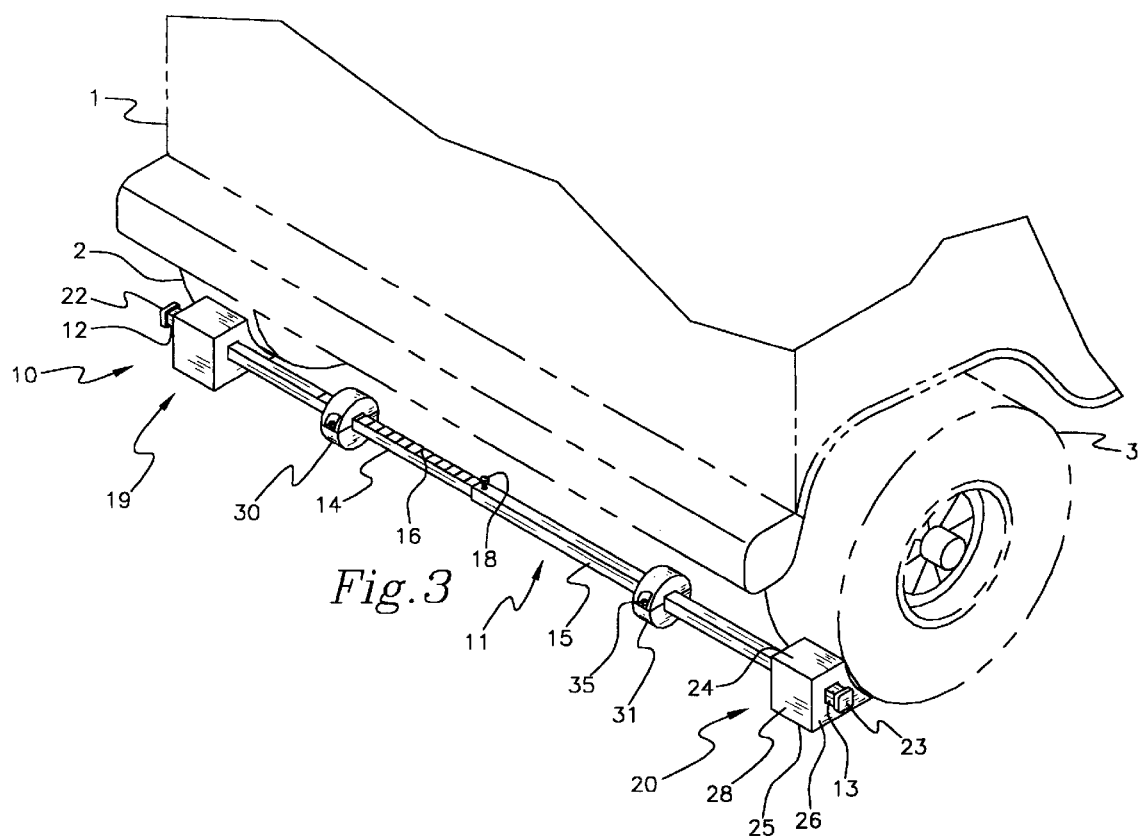
FIG. 3 is a schematic perspective view of the present invention in use to prevent a vehicle from rolling.

With reference now to the drawings, and in particular to FIGS. 1 through 3 thereof, a new wheel chock assembly embodying the principles and concepts of the present invention and generally designated by the reference numeral 10 will be described.

The wheel chock assembly 10 is designed for placement next to a pair of wheels 2,3 of a vehicle 1 to prevent the vehicle from rolling. As best illustrated in FIGS. 1 through 3, the wheel chock assembly 10 generally comprises an elongate rod 11 having a pair of opposite ends 12,13 and a pair of wheel chocks 19,20 each having a bore 21 therethrough. The rod 11 is extended through the bores 21 of the wheel chocks 19,20. One of the wheel chocks 19 is positioned towards one of the ends 12 of the rod 11 and the other of the wheel chocks 20 is positioned towards another end 13 of the rod 11.

In closer detail, the wheel chock assembly 10 includes an elongate tubular rod 11 having a pair of opposite ends 12,13, and a longitudinal axis extending between the ends 12,13 of the rod 11. The rod 11 preferably has a generally rectangular transverse cross section taken generally perpendicular to the longitudinal axis of the rod 11. The rod 11 is also preferably telescopically extendible along the longitudinal axis of the rod 11 and has first and second telescopic portions 14, 15. The first telescopic portion 14 is positioned adjacent one end of the rod 11. The second telescopic portion 15 is positioned adjacent another end of the rod 11. The second telescopic portion 15 telescopically receives the first telescopic portion 14 to permit slidable extension of the first telescopic portion 14 in and out of the second telescopic portion 15. In use, this permits a user to extend the rod to the desired length so that the wheel chocks 19,20 may each be positioned adjacent a wheel of a vehicle as illustrated in FIG. 3.

The first telescopic portion 14 has a row of notches 16 extending along the longitudinal axis of the rod 11. Preferably, the notches 16 of the first telescopic portion 14 are spaced apart at generally equal intervals. The second telescopic portion 15 has a threaded hole 17 therein. A threaded set screw 18 or bolt is threadably inserted into the threaded hole 17 of the second telescopic portion 15. In use, the set screw 18 is retractably extended into a notch 16 of the first telescopic portion 14 to releasably hold the first telescopic portion 14 in a position with respect to the second telescopic portion 15 so that the length of the first telescopic portion 14 extending out of the second telescopic portion 15 is held in place.

A pair of wheel chocks 19,20 of generally equal dimensions are included. Each wheel chock 19,20 has a bore 21 therethrough. Each of the bores 21 has a longitudinal axis and a generally rectangular outer periphery defining an area. The rod 11 is extended through the bores 21 of the wheel chocks 19,20. One of the wheel chocks 19 is positioned towards one of the ends 12 of the rod 11 and another of the wheel chocks 20 is positioned towards another end 13 of the rod 11. Each of the ends 12,13 of the rod 11 has an end cap 22,23 thereon. The end caps 22,23 each preferably comprise a resiliently deformable material such as a rubber material to prevent the ends 12,13 of the rod 11 from damaging surfaces when in contact with the surface such as to prevent dents, scratches and other damage in the surface. Each of end caps 22,23 has a generally rectangular outer perimeter defining an area therein. The area of the outer perimeter of each of the end caps 22,23 is greater than the area of the outer perimeter of each the of bores 21 such that the end caps 22,23 prevent the wheel chocks 19,20 from sliding off of the rod 11.

Ideally, each of the wheel chocks 19,20 has a hollow interior and comprise a steel material for light weight 30,31 and durability. Each of the wheel chocks 19,20 has generally flat top and bottom faces 24,25, a pair of generally flat side faces 26,27, a generally flat back face 28 and an arcuate front face 20. In use, the bottom faces 25 are designed for resting on a ground surface. Each of the arcuate front faces 20 are designed for abutting against an associated tire of a vehicle to prevent the vehicle from rolling. The top and bottom faces 24,25 of each wheel chock 19,20 lie in generally parallel planes to one another. The side faces 26,27 of each wheel chock 19,20 lie in generally parallel planes to one another and generally perpendicular to the associated top and bottom faces 24,25. The back face 28 of each wheel chock 19,20 lies in a plane generally perpendicular to the associated top and bottom faces 24,25 and the associated side faces 26,27. Each of the arcuate front faces 20 of the wheel chocks 19,20 has an upwardly facing concave surface extending between the associated top and bottom faces 24,25. The concave surfaces each are designed to conform to the curvature of a tire. The bore 21 of each of the wheel chocks 19,20 extends between the side faces 26,27 of the respective wheel chock 19,20. Preferably, the longitudinal axis of each of the bores 21 is extended generally parallel to the top, bottom, and back faces 24,25,28 of the respective wheel chock 19,20.

Preferably, a pair of weights 30,31 are included for providing additional weight 30,31 to the assembly so that it does not easily slide out from beneath the wheels of the vehicle. Each of the weights 30,31 is preferably generally disk shaped and has a central bore 32 therethrough. The central bore 32 of each of the weights 30,31 has a generally rectangular transverse cross section. The rod 11 is extended through the central bore 32 of the weights 30,31 so that the weights 30,31 are positioned between the wheel chocks 19,20. Each of the weights 30,31 preferably has a pair of generally semi-circular separable portions 33,34. Each of the separable portions 33,34 includes a portion of the central bore 32. A pair of threaded fasteners 35 couples the separable portions 33,34 together.

Preferably, an elongate pulling tool 36 is included for use with the wheel chock assembly 10. The pulling tool 36 has an elongate shaft 37 has a pulling head 38 at one end and a gripping handle 39 at another end. The pulling head 38 generally lies in a plane generally perpendicular to a longitudinal axis of the elongate shaft 37. In use, the pulling head 38 is designed for pulling or pushing the rod 11 to pull or push the assembly in and out from beneath the wheels of the vehicle. In an ideal illustrative embodiment, the pulling tool 36 has a length of about 2½ feet between the ends of the shaft 37.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel chock assembly, comprising:

an elongate rod having a pair of opposite ends, and a longitudinal axis extending between said ends of said rod;

a pair of wheel chocks each having a bore therethrough; and said rod being extended through said bores of said wheel chocks, one of said wheel chocks being positioned towards one of said ends of said rod, another of said wheel chocks being positioned towards another end of said rod;

wherein said rod has first and second telescopic portions and is telescopically extendible along said longitudinal axis of said rod, said first telescopic portion being positioned adjacent one end of said rod, said second telescopic portion being positioned adjacent another end of said rod, said second telescopic portion telescopically receiving said first telescopic portion to permit slidable extension of said first telescopic portion in and out of said second telescopic portion.

2. The wheel chock assembly of claim 1, wherein each of said ends of said rod has an end cap thereon, said end caps each comprising a resiliently deformable material.

3. The wheel chock assembly of claim, wherein 2, wherein each of said bores of said wheel chocks have a longitudinal axis and a generally rectangular outer periphery defining an area, wherein each of the end caps has a generally rectangular outer perimeter defining an area therein, said area of said outer perimeter of each of said end caps being greater than the area of said outer perimeter of each said of bores such that said end caps prevent said wheel chocks from sliding off of said rod.

4. The wheel chock assembly of claim 1, further comprising a pair of weights, each of said weights having a central bore therethrough, said rod being extended through said central bore of said weights, said weights being positioned between said wheel chocks.

5. The wheel chock assembly of claim 4, wherein each of said weights has a pair of generally separable portions, each of said separable portions including a portion of said central bore, wherein a threaded fastener couples said separable portions together.

6. The wheel chock assembly of claim 1, wherein each of said wheel chocks has generally flat top and bottom faces, a pair of generally flat side faces, a generally flat back face and an arcuate front face, said bottom faces being adapted for resting on a ground surface, each of said arcuate front faces being adapted for abutting against an associated tire of a vehicle.

7. The wheel chock assembly of claim 1, wherein said first telescopic portion has a row of notches extending along said longitudinal axis of said rod, said second telescopic portion having a threaded hole therein, a threaded set screw being threadably inserted into said threaded hole of said second telescopic portion, said set screw being retractably extended into a notch of said first telescopic portion to releasably hold said first telescopic portion in a position with respect to said second telescopic portion.

8. A wheel chock assembly, comprising:

an elongate rod having a pair of opposite ends, and a longitudinal axis extending between said ends of said rod;

said rod having a generally rectangular transverse cross section taken generally perpendicular to said longitudinal axis of said rod;

said rod having first and second telescopic portions and being telescopically extendible along said longitudinal axis of said rod, said first telescopic portion being positioned adjacent one end of said rod, said second telescopic portion being positioned adjacent another end of said rod;

said second telescopic portion telescopically receiving said first telescopic portion to permit slidable extension of said first telescopic portion in and out of said second telescopic portion;

said first telescopic portion having a row of notches extending along said longitudinal axis of said rod, said notches of said first telescopic portion being spaced apart at generally equal intervals;

said second telescopic portion having a threaded hole therein;

a threaded set screw being threadably inserted into said threaded hole of said second telescopic portion, said set screw being retractably extended into a notch of said first telescopic portion to releasably hold said first telescopic portion in a position with respect to said second telescopic portion;

a pair of wheel chocks each having a bore therethrough, each of said bores having a longitudinal axis and a generally rectangular outer periphery defining an area;

said rod being extended through said bores of said wheel chocks, one of said wheel chocks being positioned towards one of said ends of said rod, another of said wheel chocks being positioned towards another end of said rod;

each of said ends of said rod having an end cap thereon, said end caps each comprising a resiliently deformable material;

each of said end caps having a generally rectangular outer perimeter defining an area therein, said area of said outer perimeter of each of said end caps being greater than the area of said outer perimeter of each said of bores such that said end caps prevent said wheel chocks from sliding off of said rod;

each of said wheel chocks having generally flat top and bottom faces, a pair of generally flat side faces, a generally flat back face and an arcuate front face, said bottom faces being adapted for resting on a ground surface, each of said arcuate front faces being adapted for abutting against an associated tire of a vehicle;

said top and bottom faces of each wheel chock being lying in generally parallel planes to one another, said side faces of each wheel chock being lying in generally parallel planes to one another and generally perpendicular to the associated top and bottom faces, said back face of each wheel chock lying in a plane generally perpendicular to the associated top and bottom faces and the associated side faces;

each of said arcuate front faces of said wheel chocks having an upwardly facing concave surface extending between the associated top and bottom faces;

said bore of each of said wheel chocks extending between said side faces of the respective wheel chock, said longitudinal axis of each of said bores being extended generally parallel to said top, bottom, and back faces of the respective wheel chock;

a pair of weights, each of said weights being generally disk shaped an having a central bore therethrough, said central bore of each of said weights having a generally rectangular transverse cross section;

said rod being extended through said central bore of said weights, said weights being positioned between said wheel chocks; and each of said weights having a pair of generally semi-circular separable portions, each of said separable portions including a portion of said central bore, wherein a threaded fastener couples said separable portions together.

9. In combination:

a wheel chock assembly, comprising:

an elongate rod having a pair of opposite ends, and a longitudinal axis extending between said ends of said rod;

said rod having a generally rectangular transverse cross section taken generally perpendicular to said longitudinal axis of said rod;

said rod having first and second telescopic portions and being telescopically extendible along said longitudinal axis of said rod, said first telescopic portion being positioned adjacent one end of said rod, said second telescopic portion being positioned adjacent another end of said rod;

said second telescopic portion telescopically receiving said first telescopic portion to permit slidable extension of said first telescopic portion in and out of said second telescopic portion;

said first telescopic portion having a row of notches extending along said longitudinal axis of said rod, said notches of said first telescopic portion being spaced apart at generally equal intervals;

said second telescopic portion having a threaded hole therein;

a threaded set screw being threadably inserted into said threaded hole of said second telescopic portion, said set screw being retractably extended into a notch of said first telescopic portion to releasably hold said first telescopic portion in a position with respect to said second telescopic portion;

a pair of wheel chocks each having a bore therethrough, each of said bores having a longitudinal axis and a generally rectangular outer periphery defining an area;

said rod being extended through said bores of said wheel chocks, one of said wheel chocks being positioned towards one of said ends of said rod, another of said wheel chocks being positioned towards another end of said rod;

each of said ends of said rod having an end cap thereon, said end caps each comprising a resiliently deformable material;

each of said end caps having a generally rectangular outer perimeter defining an area therein, said area of said outer perimeter of each of said end caps being greater than the area of said outer perimeter of each said of bores such that said end caps prevent said wheel chocks from sliding off of said rod;

each of said wheel chocks having generally flat top and bottom faces, a pair of generally flat side faces, a generally flat back face and an arcuate front face, said bottom faces being adapted for resting on a ground surface, each of said arcuate front faces being adapted for abutting against an associated tire of a vehicle;

said top and bottom faces of each wheel chock being lying in generally parallel planes to one another, said side faces of each wheel chock being lying in generally parallel planes to one another and generally perpendicular to the associated top and bottom faces, said back face of each wheel chock lying in a plane generally perpendicular to the associated top and bottom faces and the associated side faces;

each of said arcuate front faces of said wheel chocks having an upwardly facing concave surface extending between the associated top and bottom faces;

said bore of each of said wheel chocks extending between said side faces of the respective wheel chock, said longitudinal axis of each of said bores being extended generally parallel to said top, bottom, and back faces of the respective wheel chock;

a pair of weights, each of said weights being generally disk shaped an having a central bore therethrough, said central bore of each of said weights having a generally rectangular transverse cross section;

said rod being extended through said central bore of said weights, said weights being positioned between said wheel chocks;

each of said weights having a pair of generally semi-circular separable portions, each of said separable portions including a portion of said central bore, wherein a threaded fastener couples said separable portions together; and an elongate pulling tool having an elongate shaft having a pulling head at one end and a gripping handle at another end, said pulling head generally lying in a plane generally perpendicular to a longitudinal axis of said elongate shaft, said pulling head being adapted for pulling and pushing the rod to pull or push the assembly in and out from beneath the wheels of the vehicle.

10. A wheel chock assembly, comprising:

an elongate rod having a pair of opposite ends, and a longitudinal axis extending between said ends of said rod;

a pair of wheel chocks each having a bore therethrough; and said rod being extended through said bores of said wheel chocks, one of said wheel chocks being positioned towards one of said ends of said rod, another of said wheel chocks being positioned towards another end of said rod;

a pair of weights, each of said weights having a central bore therethrough, said rod being extended through said central bore of said weights, said weights being positioned between said wheel chocks.

11. The wheel chock assembly of claim 10, wherein said rod has first and second telescopic portions and is telescopically extendible along said longitudinal axis of said rod, said first telescopic portion being positioned adjacent one end of said rod, said second telescopic portion being positioned adjacent another end of said rod, said second telescopic portion telescopically receiving said first telescopic portion to permit slidable extension of said first telescopic portion in and out of said second telescopic portion.

12. The wheel chock assembly of claim 11, wherein said first telescopic portion has a row of notches extending along said longitudinal axis of said rod, said second telescopic portion having a threaded hole therein, a threaded set screw being threadably inserted into said threaded hole of said second telescopic portion, said set screw being retractably extended into a notch of said first telescopic portion to releasably hold said first telescopic portion in a position with respect to said second telescopic portion.

13. The wheel chock assembly of claim 10, wherein each of said ends of said rod has an end cap thereon, said end caps each comprising a resiliently deformable material.

14. The wheel chock assembly of claim 13, wherein each of said bores of said wheel chocks have a longitudinal axis and a generally rectangular outer periphery defining an area, wherein each of the end caps has a generally rectangular outer perimeter defining an area therein, said area of said outer perimeter of each of said end caps being greater than the area of said outer perimeter of each said of bores such that said end caps prevent said wheel chocks from sliding off of said rod.

15. The wheel chock assembly of claim 10, wherein each of said wheel chocks has generally flat top and bottom faces, a pair of generally flat side faces, a generally flat back face and an arcuate front face, said bottom faces being adapted for resting on a ground surface, each of said arcuate front faces being adapted for abutting against an associated tire of a vehicle.

16. The wheel chock assembly of claim 10, wherein each of said weights has a pair of generally separable portions, each of said separable portions including a portion of said central bore, wherein a threaded fastener couples said separable portions together.

* * * * *